United States Patent [19]

Funada

[11] Patent Number: 4,862,103
[45] Date of Patent: Aug. 29, 1989

[54] VARIABLE EQUALIZATION SYSTEM

[75] Inventor: Takashi Funada, Yokosuka, Japan

[73] Assignee: Hitachi, Ltd., Tokyo, Japan

[21] Appl. No.: 272,449

[22] Filed: Nov. 17, 1988

[30] Foreign Application Priority Data

Nov. 20, 1987 [JP] Japan .................................. 62-292042

[51] Int. Cl.$^4$ ........................ H03F 3/191; H03H 5/00
[52] U.S. Cl. .................................. 330/304; 330/126; 330/306; 333/28 R
[58] Field of Search ....................... 330/126, 304, 306; 333/28 R; 375/12, 14; 379/340; 381/103

[56] References Cited

U.S. PATENT DOCUMENTS 2,907,838 12/1959 Ross ................................. 333/28 R

OTHER PUBLICATIONS

Shigei, "High-Speed PCM", 1975, pp. 218, 219, Corina Publishing Co., Ltd., Tokyo, Japan.

Primary Examiner—James B. Mullins
Attorney, Agent, or Firm—Antonelli, Terry & Wands

[57] ABSTRACT

A variable equalization system is disclosed, in which a plurality of amplification cells having a plurality of filter groups with natural frequencies progressively increased four times are connected in series or in parallel, thereby making possible a variable equalization over a wide range of cable length.

4 Claims, 2 Drawing Sheets

VARIABLE EQUALIZATION SYSTEM

BACKGROUND OF THE INVENTION

The present invention relates to a cable transmission system, or more in particular to a variable equalization system suitable for a $\sqrt{f}$ equalizer requiring a wide range of variable area.

Conventional $\sqrt{f}$ equalization systems operate on the principle described below. As explained in "High-Speed PCM" authored and compiled by Yoshiharu Shigei, 1975, p. 218 to p. 219, when the cable loss undergoes a change from the standard loss of a $\sqrt{f}$ (dB) by $\Delta a \sqrt{f}$ (dB), the resulting loss is expressed by equation (1).

$$G(f) = G_0 + a\sqrt{f} + \Delta a \sqrt{f}$$
$$= G_0 + a\sqrt{\left(1 + \frac{\Delta a}{a}\right)^2 \cdot f} \quad (1)$$

This is equivalent to the frequency characteristic having moved parallelly along the frequency axis a number $$\left(1 + \frac{\Delta a}{a}\right)^2$$

of times. In spite of the variable equalization thus effected by parallel relocation of the frequency characteristic, the variable range of gain, which is limited by the amount of variation of a variable element used in a variable amplifier, is narrow.

In the prior art described above, the general $\sqrt{f}$ characteristic is changed by equivalently displacing the position of a natural frequency of an amplifier with a fixed gain. As a result, the variable characteristic range is limited by the amount of change of a variable element.

When a variable-capacity diode is used as a variable element, for example, the variable range is limited by the ratio between maximum and minimum capacities. In order to overcome this difficulty, a fixed attenuator is inserted with a false line to enlarge the variable range in the prior art systems. This makes it necessary to insert or remove the false line in accordance with an applicable line, thereby causing a difficulty in the maintenance, line design, etc.

SUMMARY OF THE INVENTION

The object of the present invention is to provide a system which obviates the above-mentioned problem and permits variable equalization without any false line or the like over a wide range of cable length.

According to the present invention, there is provided a variable equalization system in which the line loss $L_1$ (dB) for a frequency $f_1$ is assumed to be $a\sqrt{f_1}$, and the line loss $L_2$ (dB) for a frequency $f_2$ to be $a\sqrt{f_2}$. When $f_2$ is a frequency four times higher than $f_1$, equation (2) is satisfied.

$$L_1 = 2L_2 \quad (2)$$

In an equalizer, as shown in FIG. 3, if the frequency $f_2$ is assumed to be a quadruple of the frequency $f_1$, the gain for $f_2$ is given as 2A where A is the gain for $f_1$. In order to realize this relationship, a plurality of filters having frequency characteristics with natural frequencies progressively varied in natural frequency by four times are connected in cascade or in parallel with a plurality of variable-gain amplifiers with a flat frequency characteristic.

A plurality of filters with natural frequencies about four times different from each other permits the use of amplifiers of the same gain change characteristic as will be explained below and is very useful for circuit design.

The value A corresponds to the amplification degree of an amplifier. If the amplifier is a variable amplifier, therefore, A may take a free value, so that the $\sqrt{f}$ characteristic may be variable. Also, if a is 0 (dB), a signal free of loss may be handled.

BRIEF DESCRIPTION OF THE DRAWINGS

FIGS. 1 and 2 show embodiments of the present invention, in which FIG. 1 is a circuit diagram of an embodiment with amplification cells of amplification degree $A_1$ and frequency characteristic $F_m$ connected in cascade, and FIG. 2 a circuit diagram of an embodiment with the same cells connected in parallel.

DESCRIPTION OF THE PREFERRED EMBODIMENTS

Figure 1:
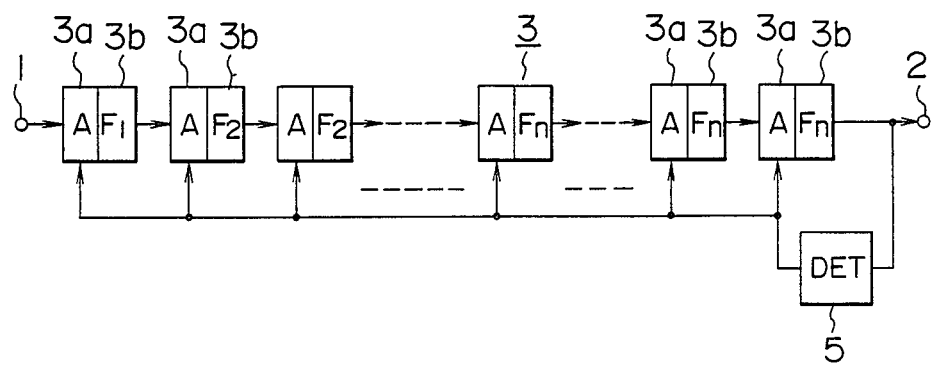
Figure 4:
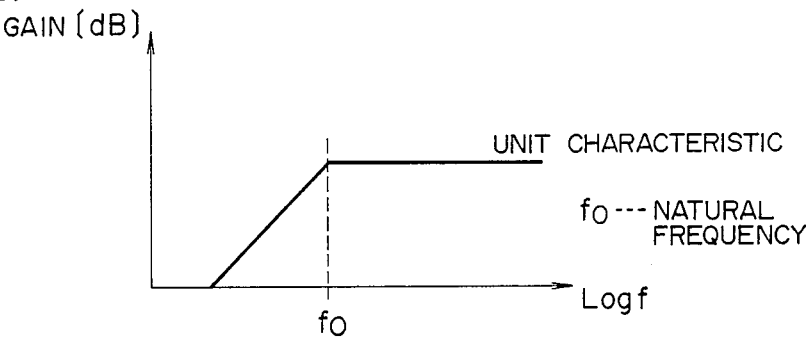
FIG. 4 shows the characteristics of a filter used according to the present invention.
Figure 5:
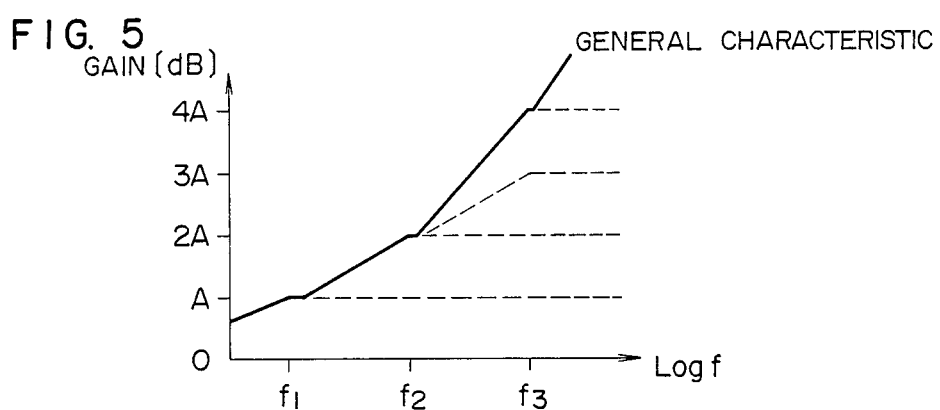
FIG. 5 is a diagram showing a general characteristic of the filter of FIG. 4 applied to the configuration of FIG. 1.

An embodiment of the present invention will be explained below with reference to FIGS. 1 to 5. FIG. 1 shows an example of a configuration comprising a plurality of amplification cells 3 each including an amplifier 3a of amplification degree A and a filter 3b of natural frequency $F_m$ (m: Integer), where m is an integral number from 1 to n, and the ratio between the frequency m and frequency m−1 is 4. The number of the amplification cells 3 for the natural frequency $F_m$ is one for $F_1$, two for $F_2$, four for $F_3$, eight for $F_4$, and multipled in this way. In FIG. 1, numeral 1 designates an input section, numeral 2 an output section, and numeral 5 an output amplitude detection circuit for controlling the amplifiers 3a. In this case, if a filter is used which has a frequency characteristic as shown in FIG. 4 and a low-range cut-off frequency $F_0$ corresponding to $F_m$, a combined general characteristic is as shown in FIG. 5, indicating an approximated $\sqrt{f}$ characteristic.

Even in the case where the variable range of the amplification degree A is comparatively narrow, the transmission line loss can be variable continuously over a wide range by increasing the value of n, thereby eliminating the need to widen the variable gain range by insertion or removal of a false line as in the conventional systems.

Figure 2:
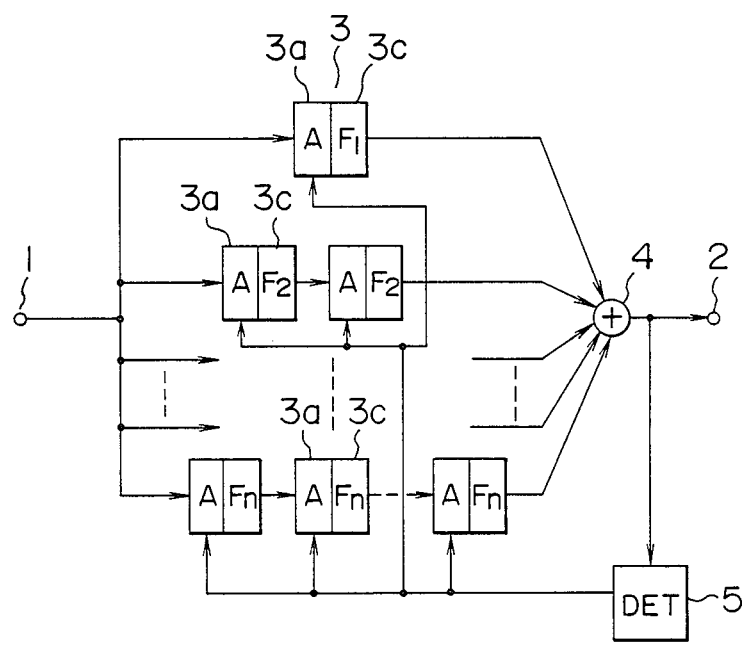
Figure 3:
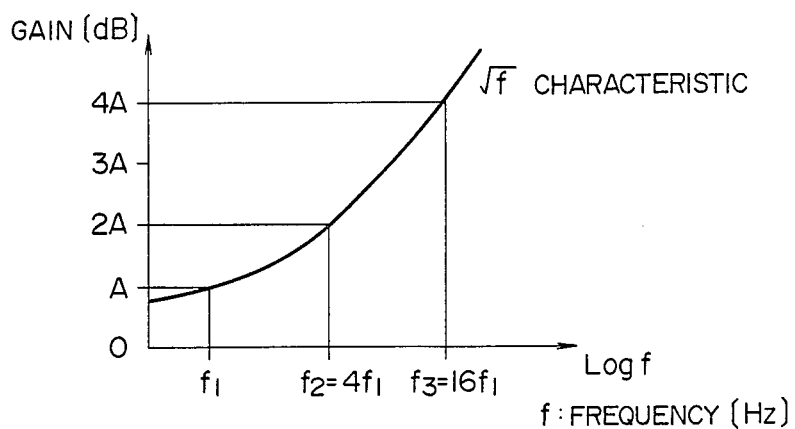
FIG. 3 shows the characteristics of a filter.

FIG. 1 uses a filter (high-pass type) having a frequency characteristic advantageous to cascade connection. FIG. 2 shows, on the other hand, an example of the configuration using a filter (band-pass type) 3c having a frequency characteristic advantageous to parallel connection. In FIG. 2, numeral 4 designates an adder, and the cable equalization characteristic in this case is the same as that in FIG. 1.

Specifically, in FIG. 2, an amplification cell 3 including an amplifier 3a of amplification degree A and a filter 3c of natural frequency $F_1$, a series circuit of a couple of amplification cells 3a each including an amplifier 3a of amplification degree A and a filter 3c of natural frequency $F_2$, four amplification cells ($F_3$ in natural frequency) in series, eight amplification cells ($F_4$ in natural frequency) in series, and so on are connected in parallel to each other.

An experiment with a 100 Mb/s bipolar signal variable equalizer according to this method shows that the line loss can be continuously variable from 0 (dB) to about 70 (dB) (f=100 MHz) and that the $\sqrt{f}$ equalization error is kept not more than about 1.5 (dB) in the worst case.

It will thus be understood from the foregoing description that according to the present invention, an equalized amplification of a signal is possible free of any insertion or removal of a false line over a wide range of cable length, and therefore the scope of application to transmission systems is widened while at the same time improving the maintainability.

I claim:
1. A variable equalization system comprising:
   a plurality of first amplification cells, each including a variable gain amplifier with a flat frequency characteristic and a filter with a natural frequency of $F_1$;
   a plurality of second amplification cells twice more than the first amplification cells, and each including a variable gain amplifier of a flat frequency characteristic and a filter having a natural frequency $F_2$ four times higher than the natural frequency $F_1$ of the filters of the first amplification cells: and
   a plurality of third amplification cells twice the second amplification cells in number, each of the third amplification cells having a variable gain amplifier of a flat frequency characteristic and a filter of a natural frequency $F_3$ four times higher than the natural frequency $F_2$ of the filters of the second amplification cells,
   the first amplification cells, the second amplification cells and the third amplification cells being connected in series.
2. A variable equalization system according to claim 1, wherein each of the filters is of high-pass type.
3. A variable equalization system comprising:
   a plurality of first amplification cells each including a variable gain amplifier of a flat frequency characteristic and a filter of a natural frequency $F_1$;
   a plurality of second amplification cells including amplification cells in series twice as many as the first amplification cells, each including a variable gain amplifier of a flat frequency characteristic and a filter of a natural frequency $F_2$ four times as high as the natural frequency $F_1$ of the filters of the first amplification cells; and
   a plurality of third amplification cells twice as many as the second amplification cells and connected in series, each of the third amplification cells including a variable gain amplifier of a flat frequency characteristic and a filter of a natural frequency $F_3$ four times higher than the natural frequency $F_2$ of the filters of the second amplification cells;
   the first amplification cells, the second amplification cells and the third amplification cells being connected in parallel to each other.
4. A variable equalization system according to claim 3, wherein each of the filters is a band-pass type.

* * * * *